US007633433B2

(12) United States Patent  (10) Patent No.: US 7,633,433 B2
Behrens et al.  (45) Date of Patent: Dec. 15, 2009

(54) METHOD FOR DETECTING AND DOCUMENTING TRAFFIC VIOLATIONS AT A TRAFFIC LIGHT

(75) Inventors: Andreas Behrens, Langenfeld (DE); Bernhard Dohmann, Langenfeld (DE); Norbert Terlau, Kuerten (DE)

(73) Assignee: Robot Visual Systems GmbH, Monheim (DE)

( * ) Notice: Subject to any disclaimer, the term of this patent is extended or adjusted under 35 U.S.C. 154(b) by 0 days.

(21) Appl. No.: 12/247,591

(22) Filed: Oct. 8, 2008

(65) Prior Publication Data
US 2009/0102699 A1  Apr. 23, 2009

(30) Foreign Application Priority Data
Oct. 11, 2007 (EP) .................................. 07403002

(51) Int. Cl.
*G01S 13/62* (2006.01)
(52) U.S. Cl. ................... 342/109; 342/114; 342/115; 342/54; 342/179; 340/936; 340/937
(58) Field of Classification Search ............. 342/70–72, 342/104, 109, 114–115, 52, 54–55, 176, 342/179; 340/936–937
See application file for complete search history.

(56) References Cited

U.S. PATENT DOCUMENTS

| 5,041,828 | A | * | 8/1991 | Loeven | 340/937 |
|---|---|---|---|---|---|
| 6,100,819 | A | * | 8/2000 | White | 340/933 |
| 6,970,102 | B2 | * | 11/2005 | Ciolli | 340/933 |
| 2004/0252193 | A1 | * | 12/2004 | Higgins | 348/149 |
| 2005/0122235 | A1 | * | 6/2005 | Teffer et al. | 340/937 |
| 2005/0156757 | A1 | * | 7/2005 | Garner | 340/907 |
| 2006/0033654 | A1 | | 2/2006 | Mende et al. | |
| 2006/0055560 | A1 | | 3/2006 | Janssen | |
| 2006/0092043 | A1 | * | 5/2006 | Lagassey | 340/907 |
| 2006/0181433 | A1 | * | 8/2006 | Wolterman | 340/917 |
| 2007/0069920 | A1 | * | 3/2007 | Hakki et al. | 340/907 |
| 2008/0278365 | A1 | * | 11/2008 | Klein et al. | 342/104 |
| 2008/0278366 | A1 | * | 11/2008 | Behrens | 342/109 |

(Continued)

FOREIGN PATENT DOCUMENTS

DE  10339954 A1 * 3/2005

(Continued)

OTHER PUBLICATIONS

"Police hope to employ red-light cameras to issue speeding tickets: But province must change legislation :[Final Edition]", Florence Loyie, Journal Staff Writer. Edmonton Journal. Edmonton, Alta.:Mar 22, 2002. p. B4.*

*Primary Examiner*—John B Sotomayor
(74) *Attorney, Agent, or Firm*—Duane Morris LLP (57) ABSTRACT

A method for detecting and documenting red-light violations and/or speeding violations in which a radar beam is directed across all lanes of a roadway of interest and in which the speed and the position of a vehicle which passes through the radar beam are determined from the radar signals so as to be able to predict the probability of a red-light violation from the speed and the determined distance of the measured vehicle from a stop line and to trigger the recording of images of the violating vehicle at predetermined distances from the stop line.

14 Claims, 4 Drawing Sheets

| U.S. PATENT DOCUMENTS | | | |
|---|---|---|---|
| 2009/0102699 A1 * | 4/2009 | Behrens et al. | 342/109 |
| 2009/0207046 A1 * | 8/2009 | Arrighetti | 340/937 |

FOREIGN PATENT DOCUMENTS

| DE | 10 2004 040 015 B4 | 12/2006 |
|---|---|---|
| EP | 1 662 272 A1 | 5/2006 |
| WO | WO 00/31969 | 6/2000 |

* cited by examiner

METHOD FOR DETECTING AND DOCUMENTING TRAFFIC VIOLATIONS AT A TRAFFIC LIGHT

FIELD OF THE INVENTION

The present invention relates to a method for monitoring a traffic area (observation area) for the purpose of detecting traffic violations, as it is generically known from the European Patent Application EP 1 662 272 A1. Systems of this type can be used to establish a red-light violation, a speeding violation, and a combination of a red-light and speeding violation.

BACKGROUND OF THE INVENTION

In general, the known methods for monitoring traffic areas differ in that different types of sensors are used, which sensors are either embedded beneath the roadway surface or are disposed above the roadway surface. Sensors that are embedded beneath the roadway surface are associated with high installation costs and must be replaced from time to time as the roadway surface wears down over time.

According to EP 1 662 272 A1, instead of embedding a sensor at a predetermined site in each individual lane, a radar beam of low beam expansion which is emitted by a radar antenna is directed at a circumscribed observation site to detect automotive vehicles as they pass the observation site. The detection can be used to activate a red-light camera, to detect the speed of a vehicle or to measure the volume of traffic.

Based on the knowledge of the distance between the observation point and the transmitting and receiving site of the radar beam, compared to the distance derived from the reflected signals, it can be readily determined when a vehicle passes the observation point in order to generate an activating signal. To avoid incorrect detection, it is proposed that a series of distances be derived from a large number of reflected signals and to accept the detection of the vehicle at the observation site as valid only if the values of the distances agree with one another.

The reception of a large number of reflection signals is based on the assumption that the observation site is not a point that a vehicle passes but is an extended area which is described by a large number of distances, all of which are located within a distance range. Therefore, the applicant believes that instead of using the term observation site, it would be more appropriate to use the term observation area, which will in fact be the term used hereinafter to describe the invention.

Since according to EP 1 662 272 A1 the radar beam is directed in a circumscribed manner at an observation area that is circumscribed within a lane, each detected distance must be linked with the associated lane, which lane uniquely identifies the measured vehicle.

As the drawings of EP 1 662 272 A1 indicate by way of an example, the observation area used in the method for detecting a red-light violation is limited to 2 m and includes the stop line.

Since, as proposed, an activating signal, which triggers a camera connected to a traffic light, is generated when a vehicle is detected within the observation area, it is ensured that an image is captured when a vehicle passes through the observation area, and thus crosses the stop line, within a specific switch phase of the traffic light, e.g., only within the red-light phase.

The rules to prove traffic violations differ from country to country. For example, there are countries in which a first image must be taken several meters before the stop line in order to prove a red-light violation.

This might suggest to the person skilled in the art that the observation area therefore be circumscribed before the stop line. However, this solution would have the drawback that a picture of a vehicle is recorded even if the vehicle comes to a stop before the stop line.

Another drawback of a method according to EP 1 662 272 A1 is that in order to detect traffic violations, each lane requires a radar antenna and, moreover, each radar antenna must be oriented separately. The investment cost for the traffic areas to be monitored increases with the number of the lanes to be monitored.

SUMMARY OF THE INVENTION

Thus, the problem to be solved by the present invention is to make available an improved method, by means of which several lanes of a roadway can be monitored for traffic violations using only one radar antenna, i.e., red-light violations and speeding violations, and probable red-light violations can be detected with greater accuracy even before the stop line.

This problem is solved by a method as described in claim 1. Useful embodiments are described in the dependent claims.

For the definition of the invention, it is necessary that a radar beam be directed across and/or at all lanes of a roadway of interest and that the points of impingement of the radar beam within an observation area be linked with their position with respect to the radar antenna, with their distance from a stop line and with the speed of the vehicle at the time that the radar beam impinges on the vehicle.

The observation area is situated in the direction of travel, completely before the stop line or it can include the stop line.

Based on the radar signals from the points of impingement before the stop line, using the path-time law, it is possible to predict from the speed and the perpendicular distance to the stop line whether the vehicle will cross over the stop line and whether a signal will be triggered, if necessary, in order to immediately capture an image of the vehicle after a time delay or at a fixed point relative to the stop line.

At points of impingement at a distance of zero to smaller than one vehicle length, it is ensured that the vehicle crosses over the stop line, and the signal can be triggered immediately without making a prediction.

To document a red-light violation, a signal to trigger a camera will be generated only if a violation is considered to have been confirmed or if the prediction indicates that the vehicle crosses over the stop line during a predetermined switch phase.

Depending on the direction of the radar beam and the angular aperture of the radar lobe and the scope of the observation area, the position of a point of impingement can be defined sufficiently accurately solely by a distance or by a distance and an angle.

It is obvious to the person skilled in the art that the point of impingement mentioned is not actually an area that is reduced to a point on which the radar beam impinges, but more correctly comprises all surfaces of a vehicle that are impinged by the radar beam and that reflect the radar beam more or less onto the radar antenna.

For the sake of describing the invention in simple terms, without being concerned with the derivation of the speed, the distance, or the angle of the measured reflection surface, reference will hereinafter be made to a point of impingement that can be linked with a speed, a distance and an angle.

Various methods and systems that can be suitably used in these methods for deriving the parameters mentioned from the radar signals are known from the prior art, such as the planar antenna with two separate reception surfaces described in DE 10 2004 040 015 B4.

As a function of the speed of the measured vehicle and the scope of the observation area in the direction of travel, a number of points of impingement are measured, and the parameters mentioned are derived from the radar signals. Multiple measurements make it possible to verify already-derived measured values, on the one hand, and to track the lane that the vehicle describes on the roadway, on the other hand.

Via its derivable position, each point of impingement is linked with a lane and thus with the stop line of this lane.

The stop lines which always run perpendicular to the edge of the roadway can be aligned across the entire width of the roadway, but they can also be offset from one another, for example, to cause vehicles in turn-off lanes to stop at a different distance from and before the traffic light.

In addition, violations can be detected lane-selectively for different switch phases of the traffic light system.

The method makes it possible not only to detect red-light violations but also to detect speeding violations. At the same time, it is also possible to monitor different speed limits lane-selectively.

A system for implementing the method can be programmed to detect both types of violations or only one type of violation. Thus, if, for example, the function of the traffic light is turned off during times of low traffic volumes, the system can continue to operate and detect only speeding violations.

The method according to the present invention makes it possible to detect red-light violations and/or speeding violations of vehicles that drive on different lanes of a roadway, using only one system that is mounted in one location.

BRIEF DESCRIPTION OF THE DRAWINGS

The present invention will be described in connection with the annexed drawings that describe a number of practical examples, in which.

DESCRIPTION OF AN EMBODIMENT OF THE INVENTION

Figure 1:
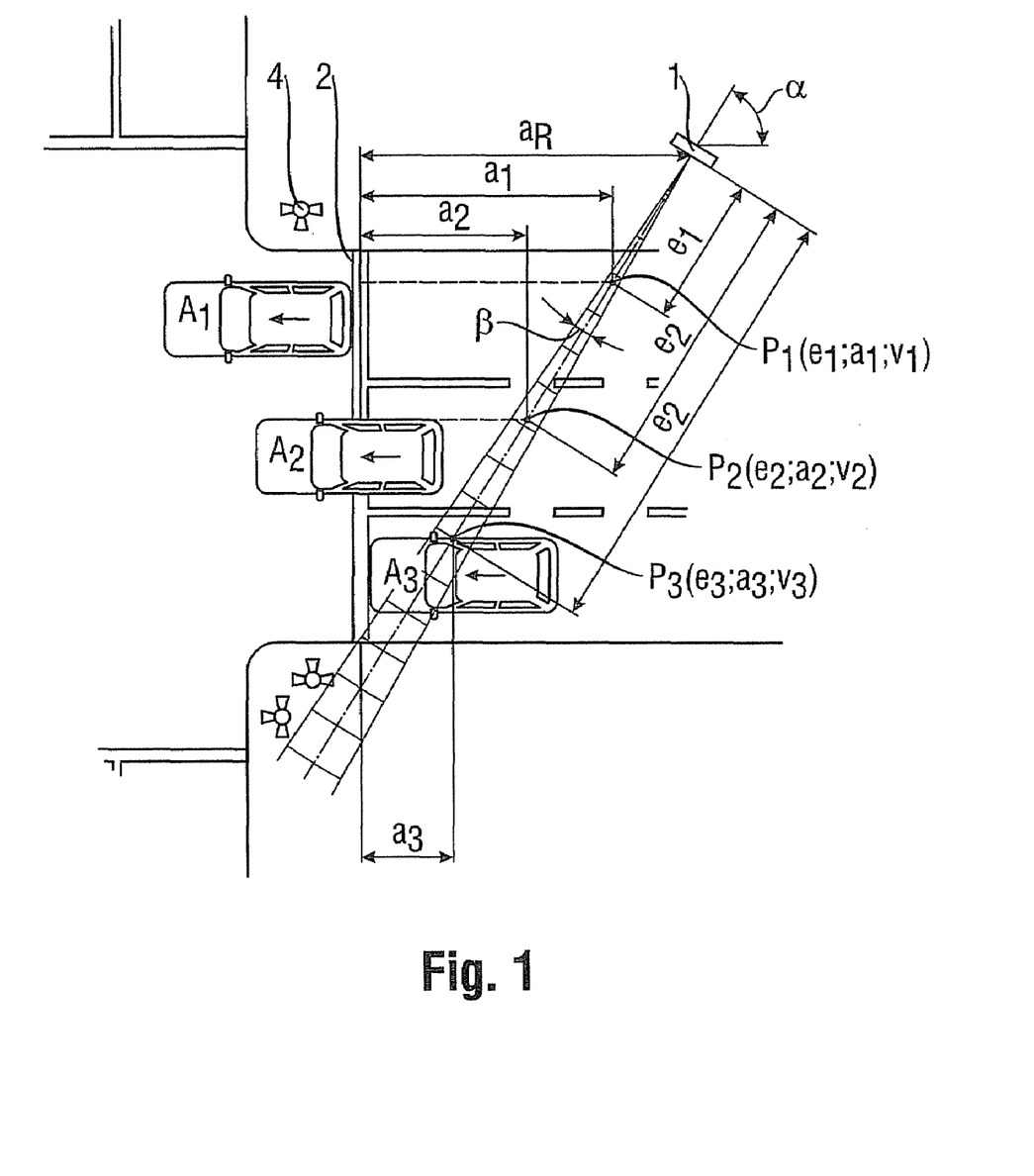
FIG. 1 shows a first practical example in which the traffic leaving the intersection is detected by means of a radar lobe that is directed predominantly diagonally to the roadway direction.

In a first practical example, shown in FIG. 1, the method will be carried out using a radar antenna of a radar device 1 which directs a narrow radar lobe with an angular aperture $\beta$ smaller than 10°, in particular 5°, substantially diagonally with respect to the direction of the roadway, i.e., at a mounting angle $\alpha$ of approximately 60° with respect to the direction of the roadway across all three lanes of a roadway. As the vehicles pass through the radar lobe, they drive away from the radar device 1.

Figure 2:
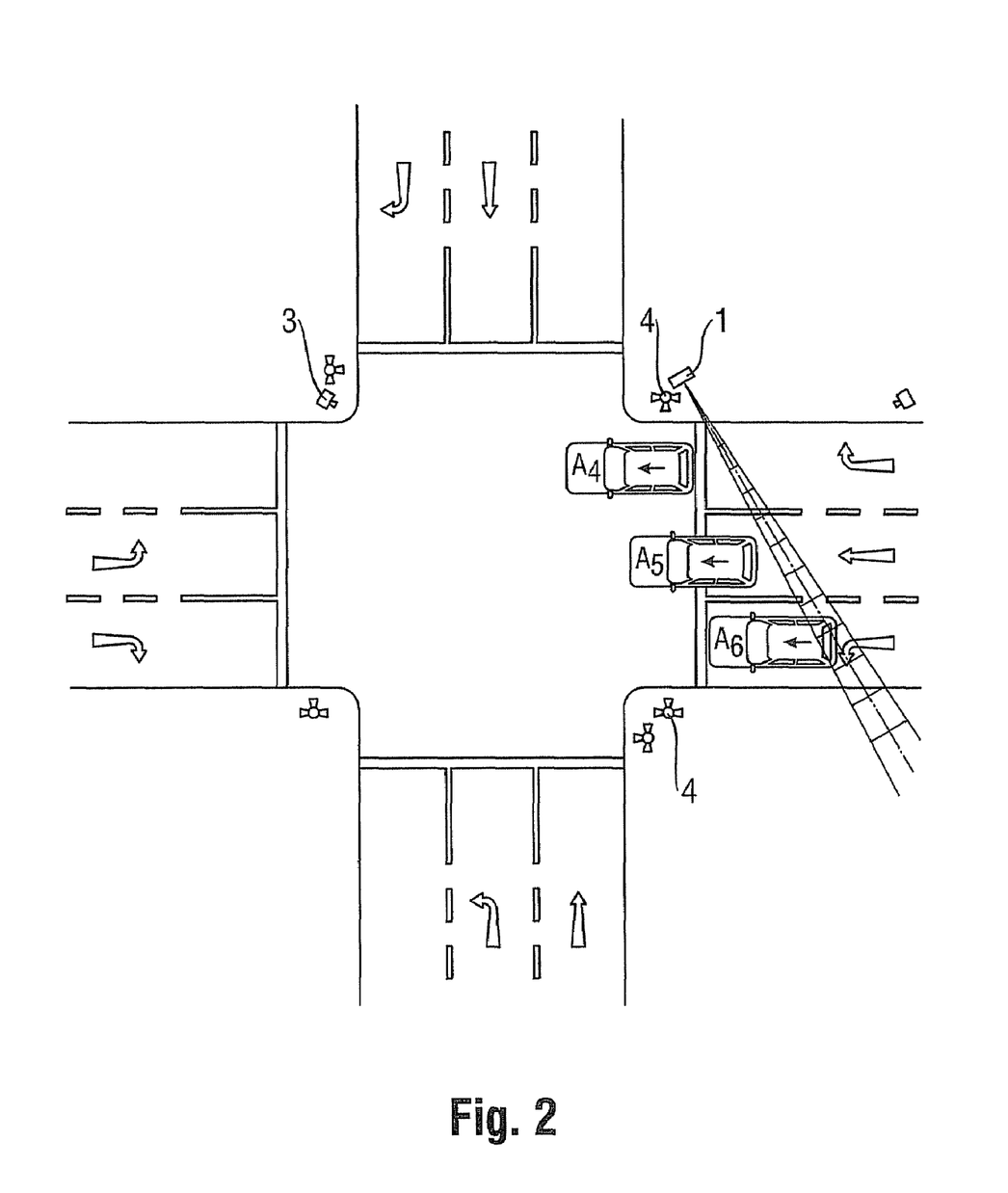
FIG. 2 shows a second practical example in which the traffic approaching the intersection is detected by means of a radar lobe that is directed predominantly diagonally to the roadway direction.

A second practical example, shown in FIG. 2, differs from the first practical example only in that the vehicles drive toward the radar device 1 as they pass through the radar lobe. This difference basically affects only the mounting site of a recording unit, by means of which a detected violation is documented by a captured image.

In the first practical example, the observation area is defined by the marginal rays of the radar lobe and the roadway boundaries on both sides and is located before a stop line 2.

Because of the small angular aperture $\beta$ of the radar lobe, the position of a point of impingement P can be determined sufficiently accurately by the mounting angle $\alpha$ and the derived distance e which, for the sake of simplification, is shown as the distance of a point of impingement P on the radar axis.

Vehicles that are detected with their side closest to the radar device 1 are detected with a distance that can be linked unequivocally with only one lane. Exceptions are distances located on or near a line which separates the lanes.

Each derived distance e—in FIG. 1, the distances e1, e2 and e3 are shown as an example for the vehicles A1, A2 and A3, respectively,—can be linked with a perpendicular distance, in this case with a1, a2 and a3, respectively, from a stop line 2. The stop lines 2 of the three lanes are shown on the roadway, aligned with one another, at a distance $a_R$ from the radar device 1, perpendicular to the edge of the roadway.

To be able to link the individual points of impingement P to an associated distance a, the accurate location of the stop line 2 relative to the mounting site of the radar antenna of the radar device 1 and the radar antenna's mounting angle must be determined and must be made available to a computer unit that is connected to the radar device 1.

For a stop line 2, which always runs perpendicular to the edge of the roadway, the position of the stop line 2 is already defined by its perpendicular distance $a_R$ from the radar device 1. In this case, a distance "a" results for a point of impingement P as the difference between the fixed distance $a_R$ and the product of a distance e and the sinus of 90° minus the fixed mounting angle $\alpha$, which means, e.g., that the distance $a1 = a_R - e1 \times \sin(90° - \alpha)$ results for the vehicle A1.

To predict according to the present invention whether a measured vehicle, e.g., vehicle A1 which, as it is passing, is responsible for the point of impingement P1, in fact crosses the stop line 2, not only its distance e1 but also its speed v1 is derived from the radar signals and linked with the point of impingement P1.

Based on the path-time law, it is subsequently possible to predict from the distance a1 and the speed v1 for the point of impingement P1 whether the vehicle will come to a stop before the stop line 2 or whether it will cross the stop line.

At the same time, the detected speed v1 can be compared with a cut-off speed that is associated with the lane in order to be able, if necessary, to establish a speeding violation as well.

The radar device 1 is connected to a traffic light system. As the red-light phase (optionally also the yellow light phase) begins, the system and thus the monitoring cycle are activated so that a vehicle passing through the radar lobe can be detected.

To determine the speed of the vehicle according to the Doppler principle, a mounting angle of approximately 20° would be optimal. As the angle increases, the results measured to determine the speed of the vehicle become less accurate and, as the angle approaches 90°, the results measured become more and more unusable. In contrast, to predict the probability of a red-light violation, a mounting angle of 85°-87.5° would be optimal since, in this case, the distance from the stop line for points of impingement P within the observation area, which can at most correspond to the radar lobe, would be identical for all lanes. The greater the distance of the radar lobe, and thus of the observation area, from the stop line 2, the more likely will it be that a vehicle, after having left the radar lobe, can spontaneously accelerate or brake, thereby causing the measurement of the detected event to be annulled.

A mounting angle range between 45° and 75° has been proven to be a good compromise.

Of special importance is the angular aperture β of the radar lobe, since the determination of the distance becomes less accurate as the angular aperture increases.

By determining the distance e between the point of impingement P on the measured vehicle A and the radar antenna, the position of the vehicle A can be inferred, which means that it is possible to determine on which lane the vehicle A approaches a stop line 2. Thus, it is possible to predict a traffic violation lane-selectively, particularly if different traffic light phases, e.g., for vehicles turning right, are switched for the different lanes. A traffic violation is confirmed if the speed detected is higher than a cut-off speed specified for a specific lane and/or if a vehicle crosses the stop line 2 during a red-light phase.

A violation of the allowed cut-off speed is determined by the radar device 1 by means of the Doppler Effect and documented in a photographic recording. To identify the driver, a frontal photograph is necessary. To this end, a photographic recording is triggered in cases of speeding violations by the approaching traffic as a vehicle A enters into the radar lobe, and after the measurement is concluded, the relevant data are inserted into the traffic violation record.

A red-light violation is documented on the basis of a recording which is triggered when a vehicle A approaches a stop line 2 outside a green-light phase specified for this lane and the speed of the vehicle makes a red-light violation probable.

As viewed in the direction of travel, both the right side of the roadway and the left side of the roadway are suitable for installing the radar device 1. In most cases, the necessary installation space is available on the right side of the roadway. Assuming that the necessary installation space is available, the left side of the roadway is especially suitable in cases in which the risk of shadowing in the left lane is lower because of a lower occurrence of large vehicles.

Linking the distance "a" of the stop line 2 with a point of impingement P not only makes it possible to predict whether the stop line 2 will be crossed but also allows a camera to be triggered, regardless of the speed of a vehicle, as a function of choosable distances of the vehicle A from the stop line 2.

Thus, a fixed image point can be located, e.g., exactly 10 m before, directly on, and 2 m behind the stop line 2. A second evidentiary image is normally triggered after a predetermined time interval in order to record the vehicle A after it has crossed the stop line 2.

In contrast to the prior art, a second evidentiary image and, if desired, additional evidentiary images can be triggered independently of the time, strictly related to the position, at fixed points with respect to the stop line 2.

In addition to the site of the fixed image point, it is also possible for the user to choose, as a function of the mounting site of the recording unit and thus the camera, whether the front of the vehicle or the rear of the vehicle is to appear in the predetermined position. This option ensures optimum readability of the license plates, if the system is used to photograph both the front and the rear of the vehicle.

The determination of image points as a function of the distance to the stop line 2 and not only before the stop line 2 presupposes that the observation area includes the stop line 2, which is neither the case in the first practical example nor in the second practical example described.

Figure 3:
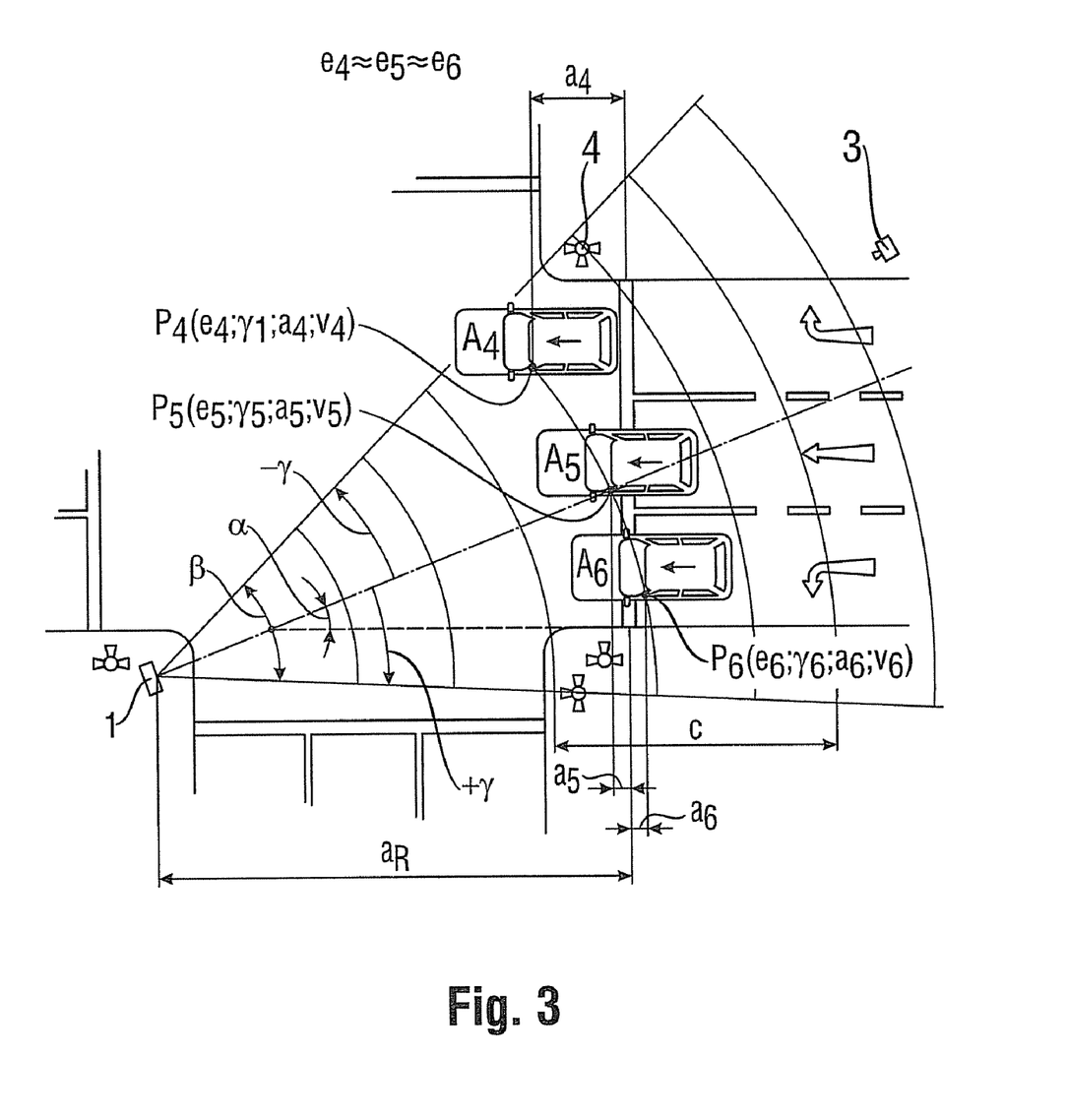
FIG. 3 shows a third practical example in which the traffic approaching the intersection is detected by means of a radar lobe that is directed predominantly lengthwise along the roadway direction.

In a third practical example, shown in FIG. 3, the radar beam is to be emitted substantially lengthwise along the direction of the roadway. To this end, a radar device 1 is positioned in such a manner that it emits a radar beam with a wide angular aperture, e.g., an angular aperture β of 20° to 40°, at a mounting angle α of the radar axis relative to the direction of the roadway smaller than 45° onto a roadway comprising several lanes. As the vehicles pass through the radar lobe, they drive toward the radar device 1.

Figure 4:
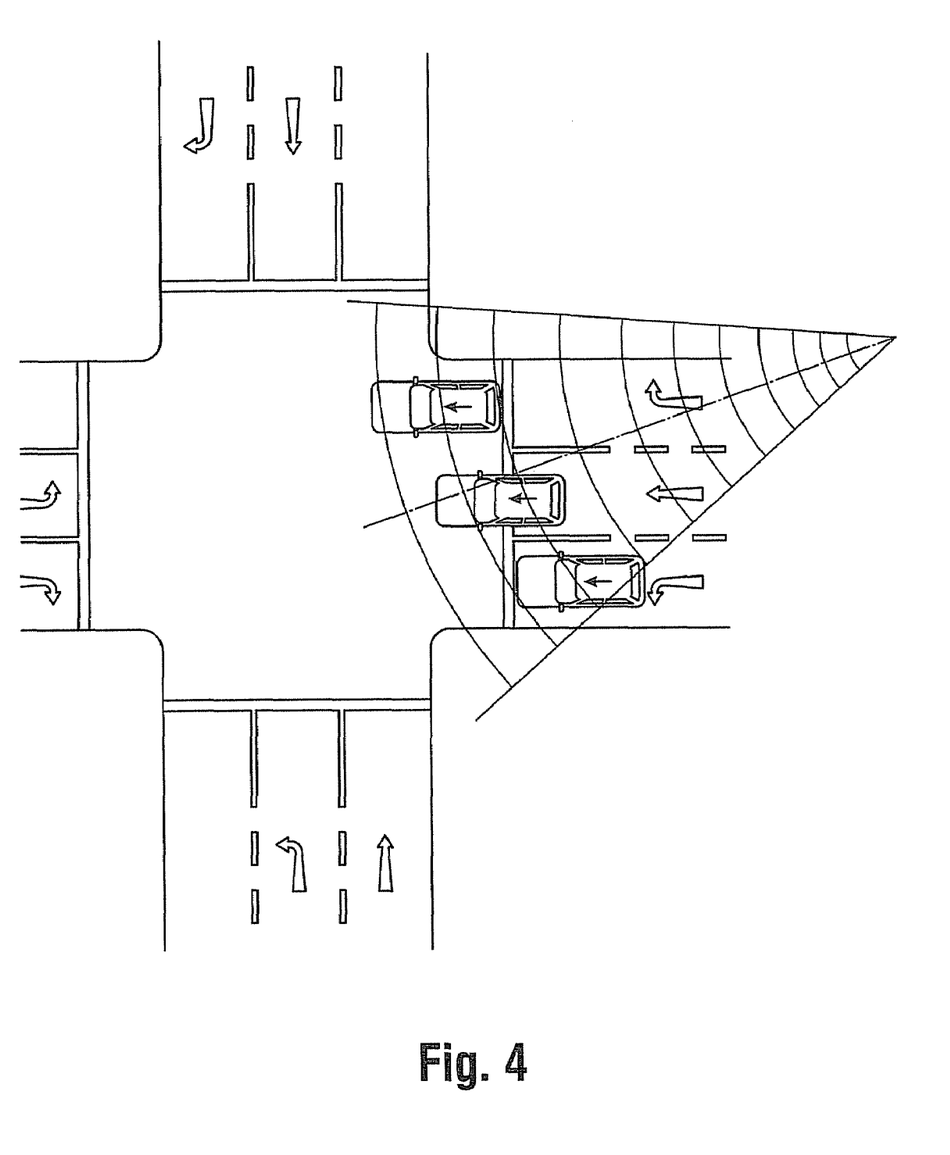
FIG. 4 shows a fourth practical example in which the traffic leaving the intersection is detected by means of a radar lobe that is directed predominantly lengthwise along the roadway direction.

A fourth practical example, shown in FIG. 4, differs from the third practical example in that the vehicles drive away from the radar device 1 as they pass through the radar lobe.

Especially because of the small mounting angle α, a sufficiently accurate determination of the position of a point of impingement P based on the distance alone is no longer possible since a derived distance cannot be linked with a single lane only, which is why, in addition to the distance, the angle relative to the axis of the radar antenna of the radar device 1 must be derived from the radar signals and linked with a point of impingement.

As FIG. 3 shows, the vehicles A4, A5 and A6 are located at nearly identical distances from the radar device 1. In this case, the distance e (from the radar device to the left upper corner of the front windshield of each vehicle), which, as e4, e5 and e6 respectively, is nearly identical was assumed to be the derived distance.

To be able to determine the position of the points of impingement sufficiently accurately, the measuring angles γ are determined, which, as γ4=−20°, γ5=0° and γ6=+20°, differ markedly from one another for the points of impingement P4, P5 and P6 of vehicles A4, A5 and A6 respectively.

Because of the wide angular aperture β of the radar lobe, it is possible to monitor a larger segment of the traffic area than in the first two practical examples and thus to perform repeat measuring operations for each vehicle within the radar lobe. The triple values obtained from speed, distance and angle are combined to a track and continuously checked for plausibility (tracking) by comparing actual values with theoretical values. The theoretical values result from the assumption that a vehicle changes directions only to a limited extent and that it also accelerates and decelerates only within certain boundaries. In contrast to a speed measurement, accelerations and decelerations during the measuring operation do not lead to the annulment of a red-light violation since the violation does not depend on the measurement; instead, the measurement merely triggers the recording that documents the red-light violation.

For the installation site of the radar device 1, both the rear position, FIG. 4, in which the radar lobe is directed lengthwise from the rear at the vehicles, and a position in which the radar lobe is directed lengthwise from the front at the vehicles, as shown in FIG. 3, in particular from the opposite side of the intersection, are suitable.

When installing the system on the right or on the left side of the roadway, it is necessary to consider the required installation space, which in most cases is available on the right side of the roadway. The left side of the roadway is especially suitable if a traffic island is available on the left side and if the risk of shadowing in the left lane is lower because of the lower occurrence of large vehicles.

Depending on the image point, a recording unit which comprises at least one camera can be disposed either in the housing of the radar device 1 or in a separate detached housing.

In the third practical example, the observation area within the radar lobe is limited to a selected distance range c which also comprises the stop line 2. Only if distance values are derived from the radar signals within the distance range will the distance to the stop line 2 be determined as well. In this manner, no signal processing takes place if the vehicles are outside the depth of focus range of a camera of the recording unit.

For distance values which can be linked with points of impingement P before the stop line 2, it is possible to predict by way of the also derived speed whether the vehicle A will cross the stop line 2 and, if this is the case, to trigger an image before the stop line 2.

In addition, when the distance of the point of impingement P and thus of the vehicle A from the stop line 2 is known, it is possible to trigger images if the vehicle A is located within certain choosable distances before, on, or behind the stop line 2.

With respect to implementing the method, the two fundamentally different configurations of the radar device 1 shown in the two practical examples differ only slightly.

In the second practical example, it is possible to position the radar device 1 and the recording unit in a single housing. In addition, due to tracking, the error of the estimate that triggers the recording is markedly smaller. Furthermore, less shadowing due to large vehicles, e.g., buses, occurs since the radar beam is directed lengthwise at the lanes.

A radar device which, in the direction of the roadway, is mounted above the roadway, e.g., on a bridge, can also direct the radar beam perpendicularly at an acute angle onto the roadway, which would essentially correspond to the second practical example, except that in practice it would be less in demand because of the increased labor expenditure required for mounting the radar device.

It is known that a permanent radar device emits a permanent radar beam of constant amplitude and frequency. When reflected by a moving object, i.e., a vehicle, this radar beam undergoes a frequency shift which depends on the speed of the vehicle. The beam portion that is reflected back to the radar antenna of the radar device 1 is compared with the emitted radar beam, and a frequency difference, the so-called Doppler frequency, is generated that is proportional to the speed of the vehicle.

By emitting a radar beam at two different frequencies, two frequency-shifted reflection beams are obtained, from the phase difference of which the distance is derived. Thus, the speed and the distance are determined by means of a single measuring operation, which ensures that the values measured are uniquely linked with one another.

In contrast to the speed, which can be measured extremely accurately by means of the Doppler radar principle, the measurement of the distance leads to a high range of variation since the radar beam, in contrast to the simplified representation, is not reflected by a single point of impingement but instead the reflections from a vehicle onto the radar antenna extend to the entire contour of the vehicle onto which the radar cross-section is projected. The radar cross section that is projected to a vehicle that passes through the radar lobe changes as a function of the geometry of the vehicle and its position within the radar lobe, beginning with the entry into and ending with the exit from the radar lobe. At each measuring time point, the receiver detects a sum of measured values (measured value set) from partial reflections. Statistically, this sum, along with other parasitically acting reflectors, such as roadway guard rails or metal fences, is as a rule received as Rayleigh distribution. The distances measured scatter by a multiple of the speeds measured.

To determine the position, a point-shaped beam, such as a laser beam, is ideal. By means of the closely bundled coherent light beams of a laser, preferably in the invisible infrared spectral range, it is possible to determine distances very accurately according to the pulse-time principle.

Thus, in a method according to the present invention, it is therefore possible to determine the distance with a laser range finding device, instead of by way of the phase shift at the frequency jumps of the radar beam, or to use the laser to additionally verify the distance value that was determined by way of the laser beam.

Verifying the distance value of the radar device 1 has the advantage that the distance value is determined not only in combination with the speed in a single measuring operation but is also verified by a second proof by means of a method that is independent of the radar device 1.

The design of the recording unit which comprises at least one camera can take many different forms which will be discussed below. To be able to use the photographic recording, the license plate and the red-light phase of the traffic light system must be clearly recognizable. Depending on the national requirements at the mounting site, a distinction is made between front and rear photography. As a rule, front photography also identifies the driver. For front photography, it may be necessary to have an additional luminescent signal available that shows the red-light phase of the traffic light system in such a manner that it is subsequently recognizable on the photographic record for use as evidence in a court of law. To increase the evidentiary value, it is also possible to combine front photography with rear photography.

On the right and/or on the left edge of the roadway, a camera can be positioned so as to be able to capture images at the image point for all lanes, which images must have evidentiary value in a court of law and, if required, unequivocally show the color of the vehicle, the license plate and, in case of front photography, the driver.

As a rule, the cameras used are single-shot cameras which, once triggered, capture two images in succession. The vehicle is detected before the stop line during a recognizable red-light phase in the first image, and in the second image, after the vehicle has crossed the stop line. However, sequential cameras which capture a series of individual images, e.g., 16 images, can also be used alone or in combination with single-shot cameras. Through a series of individual images, a sequence of a traffic event can be recorded for use as evidence. In addition, video cameras can be used alone or in combination with single-shot cameras to record a traffic event so as to be usable as evidence.

LIST OF THE REFERENCE CHARACTERS

1 Radar device
2 Stop line
3 Recording unit
4 Traffic light
A A vehicle
e A distance of a point of impingement from the radar antenna
a A perpendicular distance of a stop line from a point of impingement
$a_R$ The perpendicular distance of the stop line from the radar antenna
P A point of impingement v A speed
α The mounting angle
β The angular aperture
γ A measuring angle While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A method for detecting and documenting traffic violations at a traffic control light in which passage of vehicles through a predetermined observation area is determined by deriving distances for respective points of impingement of radar signals that are reflected by said vehicles and by determining whether said distances, and thus said points of impingement, are located within a distance range defined by said observation area, the position of which relative to a transmitting and receiving site of said radar beam is known, comprising:

directing said radar beam at least at one lane of a roadway, wherein a radar lobe formed by said radar beam forms said observation area, which, in the direction of travel of said vehicles, is located at least partially before a stop line;

determining the relative position of said stop line marked on lanes of said roadway relative to said transmitting and receiving site of said radar beam;

deriving the relative position of a point of impingement on one of said vehicles located within said observation area relative to said transmitting and receiving site of said radar beam from radar signals reflected from said one of said vehicles;

determining the perpendicular distance to a stop line from the known relative position of said stop line and the position of a point of impingement on said one of said vehicles and is linked with said point of impingement;

deriving the speed of said one of said vehicles from said radar signals and linked with the points of impingement; and determining the time point at which the vehicle crosses said stop line based on said derived speed and the distance of the point of impingement of said one of said vehicles from said stop line and if said time point is outside the green-light phase of said traffic control light associated with said stop line, initiating the creation of an image of said vehicle.

2. The method of claim 1, wherein, based on the relative position of the points of impingement, a lane of said roadway is determined and the associated speed of said vehicle is compared with a cut-off speed specified for the respective lane, and wherein the creation of an image of said vehicle is initiated if said speed of said vehicle is higher than said cut-off speed.

3. The method as in claim 2, wherein determining the time point at which at least one image is initiated is based on said derived speed and a known distance from an image point.

4. The method as in claim 3, wherein the distance to a stop line equals the distance to an image point of initiating the creation of said image.

5. The method as in claim 3, wherein the distance to a stop line is greater than the distance to said image point.

6. The method as in claim 1, wherein said radar beam is directed at an acute mounting angle and horizontally with respect to the direction of travel across said lanes of said roadway, and the radar lobe is such that the distances that can be derived from reflected radar signals of a vehicle that moves within a lane can be unequivocally linked with only one lane and the positions of the points of impingement are defined by way of the distances derived from said radar signals.

7. The method as in claim 6, wherein said observation area is determined by the side lane boundaries and the marginal rays of said radar lobe.

8. The method as in claim 1, wherein said radar beam is directed at said lanes of said roadway at an acute angle and inclined perpendicular to the roadway surface, and said radar lobe is sufficiently wide so that said radar beam impinging on the roadway surface forms a beam spot which extends across all lanes, and the positions of the points of impingement are defined by way of the distances derived from the radar signals and angles relative to the axis of a radar antenna of the radar device that receives the radar beam.

9. The method as in claim 7, wherein said observation area is determined by the beam spot.

10. The method as in claim 1, wherein said radar beam is directed at an acute mounting angle and horizontally with respect to the direction of travel across said lanes of said roadway and the radar lobe is sufficiently wide so that the derived distances can be linked not only with a single lane, and the positions of the points of impingement are defined by way of the distances derived from the radar signals and angles relative to the axis of a radar antenna of the radar device which receives the radar beam.

11. The method as in claim 10, wherein said observation area is determined by the marginal rays of said radar lobe and two imaginary lines of a predetermined distance which connect the marginal rays.

12. The method as in claim 11, wherein said predetermined distances are spaced more than 10 m apart.

13. The method as in claim 1, wherein said distance is determined by a pulse time measurement by means of a laser.

14. The method as in claim 1, wherein speeding violations are detected during times in which the function of said traffic light is turned off.

* * * * *